US012607148B2

(12) United States Patent
Morishita et al.

(10) Patent No.: US 12,607,148 B2
(45) Date of Patent: Apr. 21, 2026

(54) GAS TURBINE CONTROL DEVICE, GAS TURBINE CONTROL METHOD, AND GAS TURBINE CONTROL PROGRAM

(71) Applicant: MITSUBISHI HEAVY INDUSTRIES, LTD., Tokyo (JP)

(72) Inventors: Mitsuhiro Morishita, Tokyo (JP); Isao Taguchi, Tokyo (JP); Satoko Fujii, Tokyo (JP); Taiki Matsuda, Tokyo (JP); Kiyoshi Tarumizu, Tokyo (JP); Kazuhito Ohashi, Tokyo (JP); Teruhiro Matsumoto, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 0 days.

(21) Appl. No.: 19/303,964

(22) Filed: Aug. 19, 2025

(65) Prior Publication Data

US 2026/0085641 A1      Mar. 26, 2026

(30) Foreign Application Priority Data

Sep. 20, 2024    (JP) ................................. 2024-163587

(51) Int. Cl.
| | |
|---|---|
| *F02C 9/32* | (2006.01) |
| *F02C 7/228* | (2006.01) |
| *F02C 9/28* | (2006.01) |
| *F02C 9/34* | (2006.01) |
| *F02C 9/40* | (2006.01) |
| *F23R 3/34* | (2006.01) |

(52) U.S. Cl.
CPC ................ *F02C 9/32* (2013.01); *F02C 7/228* (2013.01); *F02C 9/28* (2013.01); *F02C 9/34* (2013.01); *F02C 9/40* (2013.01); *F23R 3/343* (2013.01)

(58) Field of Classification Search
CPC .... F02C 9/32; F02C 7/228; F02C 9/40; F02C 9/34; F23R 3/343
See application file for complete search history.

(56) References Cited

U.S. PATENT DOCUMENTS

| | | | | |
|---|---|---|---|---|
| 2021/0095599 A1* | 4/2021 | Asai | ......................... | F23R 3/346 |
| 2023/0340915 A1* | 10/2023 | Speak | ................... | B64D 27/10 |

FOREIGN PATENT DOCUMENTS

| | | |
|---|---|---|
| JP | 7403698 | 12/2023 |

* cited by examiner

*Primary Examiner* — Phutthiwat Wongwian
*Assistant Examiner* — Rene D Ford
(74) *Attorney, Agent, or Firm* — Wenderoth, Lind & Ponack, L.L.P.

(57) ABSTRACT

A gas turbine control device is for controlling a gas turbine which includes a combustor capable of co-firing a first fuel and a second fuel with a lower heating value per unit volume than the first fuel. The gas turbine control device includes a processor for determining a supply state of the second fuel to the combustor, controlling a pilot fuel ratio which is a ratio of fuel distributed to a pilot fuel injection nozzle among a plurality of fuel injection nozzles of the combustor, and controlling the pilot fuel ratio to temporarily increase when the supply state is determined to be a shut-off state.

13 Claims, 6 Drawing Sheets

GAS TURBINE CONTROL DEVICE, GAS TURBINE CONTROL METHOD, AND GAS TURBINE CONTROL PROGRAM

TECHNICAL FIELD

The present disclosure relates to a gas turbine control device, a gas turbine control method, and a gas turbine control program.

BACKGROUND

Gas turbines that can be driven by combustion gas produced by the combustion of fuel are known. Gas turbines are used, for example, in gas turbine power generation facilities, where a generator is connected to an output shaft of the gas turbine to generate electricity. Fuel used in gas turbines is, for example, liquefied natural gas (LNG), which is extracted as raw natural gas from gas fields or other sources, liquefied, and purified. In recent years, development of gas turbines that can co-fire fuel (first fuel) such as liquefied natural gas and fuel (second fuel) such as hydrogen, which has a relatively low heating value per unit volume, has been promoted (see, for example, JP 7403698 B). In such gas turbine co-firing operation, the flow rate of each fuel is controlled so that the co-firing ratio reaches a predetermined value.

SUMMARY

In a gas turbine capable of co-firing operation as described above, if the second fuel is shut off for some reason, the gas turbine may be operated to continue its operation by switching from co-firing operation to single-firing operation using the first fuel. In this case, if the opening degree of a flow control valve installed in the fuel supply line remains constant, the volume density of the fuel supplied to the combustor decreases under a constant differential pressure before and after the flow control valve, and the turbine inlet temperature temporarily drops, which can lead to misfire in the gas turbine.

At least one embodiment of the present disclosure was made in view of the above circumstances, and an object thereof is to provide a gas turbine control device, a gas turbine control method, and a gas turbine control program whereby it is possible to prevent misfire in a gas turbine that can co-fire different fuels when the fuel with the lower heating value per unit volume is shut off.

In order to solve the above-described problems, at least one embodiment of the present disclosure provides a gas turbine control device for controlling a gas turbine which includes a combustor capable of co-firing a first fuel and a second fuel with a lower heating value per unit volume than the first fuel, including: a supply state determination part for determining a supply state of the second fuel to the combustor; and a pilot fuel ratio control part for controlling a pilot fuel ratio which is a ratio of fuel distributed to a pilot fuel injection nozzle among a plurality of fuel injection nozzles of the combustor. The pilot fuel ratio control part is configured to control the pilot fuel ratio to temporarily increase when the supply state is determined to be a shut-off state by the supply state determination part.

In order to solve the above-described problems, at least one embodiment of the present disclosure provides a gas turbine control method for controlling a gas turbine which includes a combustor capable of co-firing a first fuel and a second fuel with a lower heating value per unit volume than the first fuel, including: a step of determining a supply state of the second fuel to the combustor; and a step of controlling a pilot fuel ratio which is a ratio of fuel distributed to a pilot fuel injection nozzle among a plurality of fuel injection nozzles of the combustor. The pilot fuel ratio is controlled to temporarily increase when the supply state is determined to be a shut-off state.

In order to solve the above-described problems, at least one embodiment of the present disclosure provides a gas turbine control program for controlling a gas turbine which includes a combustor capable of co-firing a first fuel and a second fuel with a lower heating value per unit volume than the first fuel, the gas turbine control program causing a computer device to execute: a step of determining a supply state of the second fuel to the combustor; and a step of controlling a pilot fuel ratio which is a ratio of fuel distributed to a pilot fuel injection nozzle among a plurality of fuel injection nozzles of the combustor. The pilot fuel ratio is controlled to temporarily increase when the supply state is determined to be a shut-off state.

At least one embodiment of the present disclosure provides a gas turbine control device, a gas turbine control method, and a gas turbine control program whereby it is possible to prevent misfire in a gas turbine that can co-fire different fuels when the fuel with the lower heating value per unit volume is shut off.

DETAILED DESCRIPTION

Figure 1:
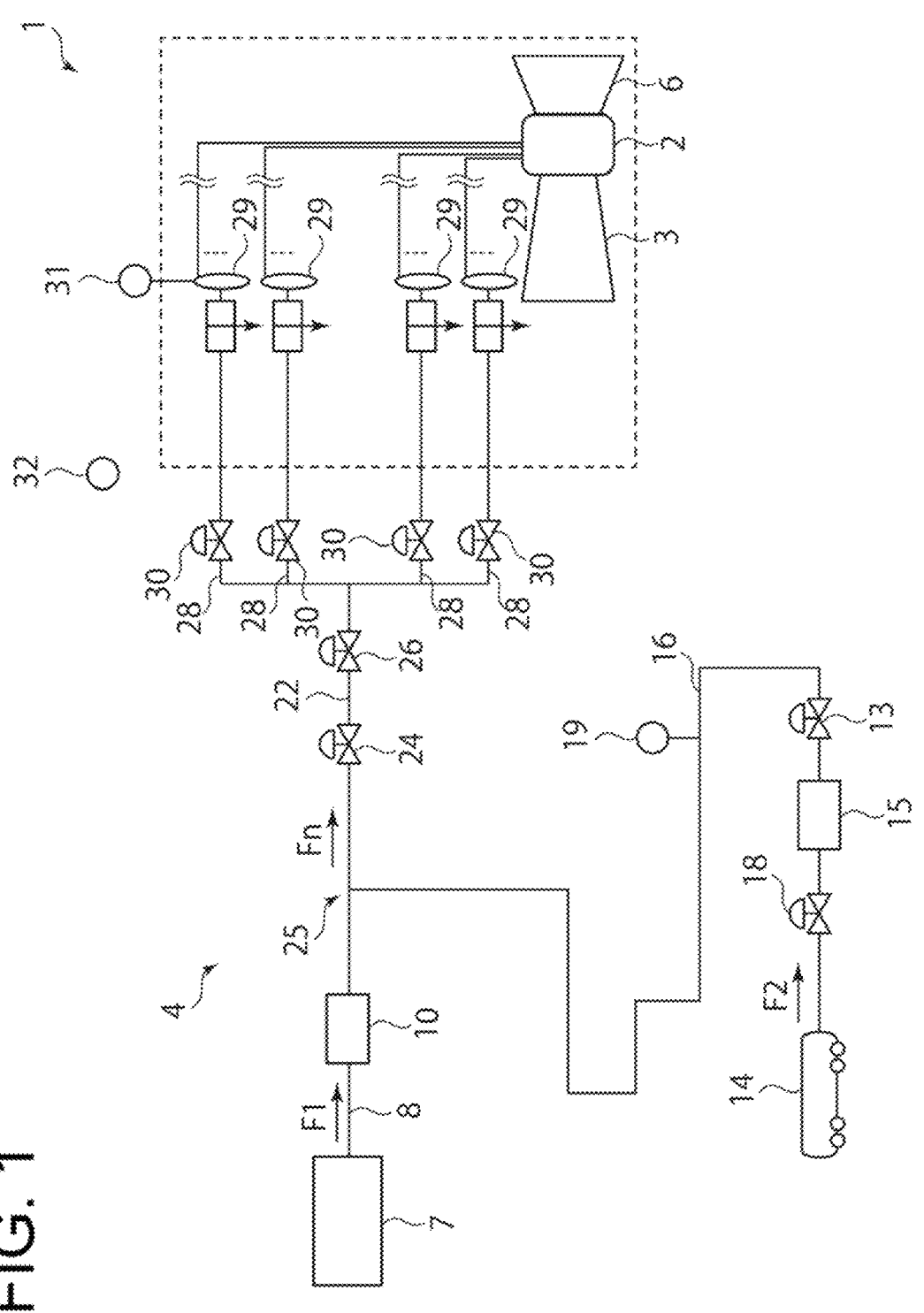
FIG. 1 is a schematic configuration diagram of a gas turbine according to an embodiment.

Embodiments of the present invention will now be described in detail with reference to the accompanying drawings. It is intended, however, that unless particularly identified, dimensions, materials, shapes, relative positions and the like of components described or shown in the drawings as the embodiments shall be interpreted as illustrative only and not intended to limit the scope of the present invention.

First, referring to FIG. 1, a gas turbine 1 to be controlled by a gas turbine control device 100 according to at least one embodiment of the present disclosure will be described. FIG. 1 is a schematic configuration diagram of the gas turbine 1 according to an embodiment.

The gas turbine 1 includes a compressor 3 for generating compressed air, a combustor 2 for generating combustion gas by burning a mixture of the compressed air generated by the compressor 3 and fuel, a fuel supply system 4 for supplying the fuel to the combustor 2, and a turbine 6 that can be driven by the combustion gas as a working fluid. The compressor 3 and the turbine 6 are connected to one shaft. In the gas turbine 1 with this configuration, the combustor 2 is supplied with the compressed air compressed by the compressor 3 and the fuel supplied from the fuel supply system 4, where they are mixed and burned to generate combustion gas. The combustion gas flows into the turbine 6 and functions as power to drive the turbine 6.

The fuel supply system 4 is configured to supply fuel to the combustor 2. The fuel supply system 4 in the present embodiment supplies at least one of the first fuel F1 or the second fuel F2 as fuel and constitutes the gas turbine 1 that can co-fire the first fuel F1 and the second fuel F2. The second fuel F2 has lower heating value per unit volume than the first fuel F1. In this embodiment, the first fuel F1 is liquefied natural gas (LNG), and the second fuel F2 is hydrogen gas.

The fuel supply system 4 includes a first fuel supply line 8 for supplying the first fuel F1 from a first fuel supply part 7 and a second fuel supply line 16 for supplying the second fuel F2 from a second fuel supply part 14. The first fuel supply line 8 is provided with a flow meter 10 for detecting the flow rate of the first fuel F1, and the second fuel supply line 16 is provided with a flow control valve 18 for regulating the flow rate of the second fuel F2, a flow meter 15 for detecting the flow rate of the second fuel F2, a shut-off valve 13 for shutting off the second fuel F2, and a pressure sensor 19 for detecting the supply pressure of the second fuel F2.

The first fuel supply line 8 and the second fuel supply line 16 join each other at a confluence point 25 on the downstream side. At least one of the first fuel F1 supplied through the first fuel supply line 8 or the second fuel F2 supplied through the second fuel supply line 16 merges at the confluence point 25 and is supplied to the combustor 2 as primary fuel Fn through a primary fuel supply line 22.

The primary fuel supply line 22 is provided with a shut-off valve 24 for shutting off the primary fuel Fn and a flow control valve 26 for regulating the flow rate of the primary fuel Fn.

The downstream side of the primary fuel supply line 22 branches into a plurality of branch pipes 28, each of which is connected to a corresponding one of a plurality of fuel injection nozzles 50 (see FIG. 2) of the combustor 2 via a manifold part 29. Each branch pipe 28 is provided with a flow control valve 30. These flow control valves 30 can control the distribution ratio of the primary fuel Fn to each branch pipe 28 by adjusting their opening degree.

The manifold part 29 of each branch pipe 28 is equipped with a pressure sensor 31 for detecting the pressure (in FIG. 1, the pressure sensor 31 in one manifold part 29 is shown as representative). Additionally, around the gas turbine 1 (especially in areas where the second fuel F2 may leak, such as second fuel supply line 16, primary fuel supply line 22, or branch pipes 28), a leak sensor 32 is installed to detect the leakage of the second fuel F2.

Figure 2:
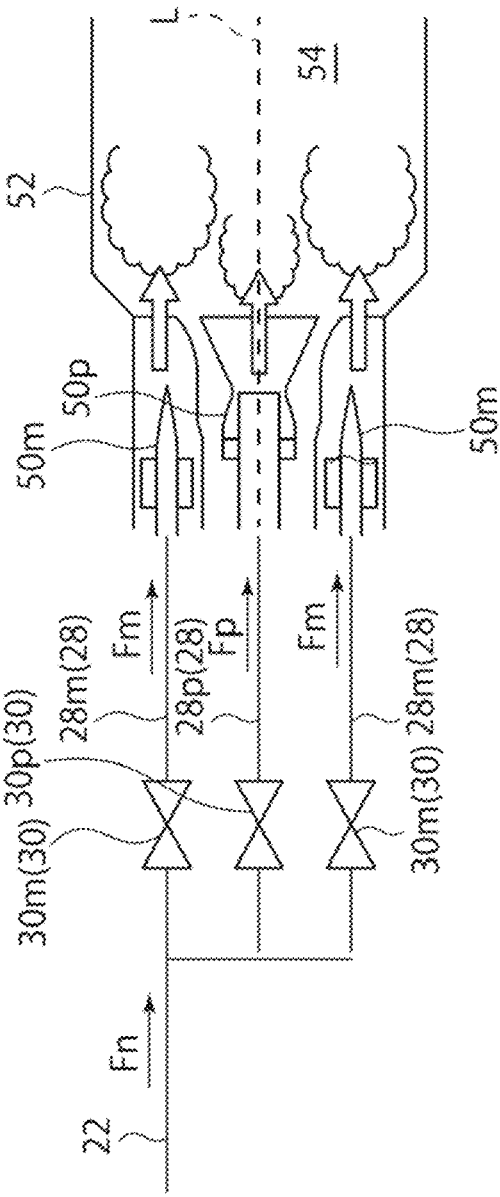
FIG. 2 is a schematic diagram showing an exemplary specific configuration of a supply path for primary fuel from a primary fuel supply line to some fuel injection nozzles of the combustor in the gas turbine of FIG. 1.

FIG. 2 is a schematic diagram showing an exemplary specific configuration of a supply path for the primary fuel Fn from the primary fuel supply line 22 to some fuel injection nozzles 50 of the combustor 2 in the gas turbine 1 of FIG. 1. The plurality of fuel injection nozzles 50 of the combustor 2 includes a pilot fuel injection nozzle 50*p* and main fuel injection nozzles 50*m*. The pilot fuel injection nozzle 50*p* is located at the center corresponding to the central axis L of a cylinder 52 of the combustor 2, and the main fuel injection nozzles 50*m* are arranged around the pilot fuel injection nozzle 50*p* along the circumferential direction. The pilot fuel injection nozzle 50*p* forms a flame in a downstream combustion chamber 54 using pilot fuel Fp, which is the primary fuel Fn supplied from the primary fuel supply line 22 through the branch pipe 28*p*. The main fuel injection nozzles 50*m* form a flame in the downstream combustion chamber 54 using main fuel Fm, which is the primary fuel Fn supplied from the primary fuel supply line 22 through the branch pipes 28*m*.

FIG. 2 shows, as the flow control valves 30 installed in the branch pipes 28 in FIG. 1, a flow control valve 30*p* for regulating the flow rate of the pilot fuel Fp supplied to the pilot fuel injection nozzle 50*p* and flow control valves 30*m* for regulating the flow rate of the main fuel Fm supplied to the main fuel injection nozzles 50*m*.

Next, the gas turbine control device 100 for controlling the gas turbine 1 having the above configuration will be described. The gas turbine control device 100 is a control unit for controlling the gas turbine 1 and includes, for example, a Central Processing Unit (CPU), a Random Access Memory (RAM), a Read Only Memory (ROM), a computer-readable storage medium, and the like. Then, a series of processes for realizing various functions is stored in the storage medium or the like in the form of a program, as an example. The CPU reads the program out to the RAM or the like and executes processing/calculation of information, thereby realizing the various functions. A configuration where the program is installed in the ROM or another storage medium in advance, a configuration where the program is provided in a state of being stored in the computer-readable storage medium, a configuration where the program is distributed via a wired or wireless communication means, etc., may be applied. The computer-readable storage medium may be a magnetic disk, a magneto-optical disk, a CD-ROM, a DVD-ROM, or a semiconductor memory.

Figure 3:
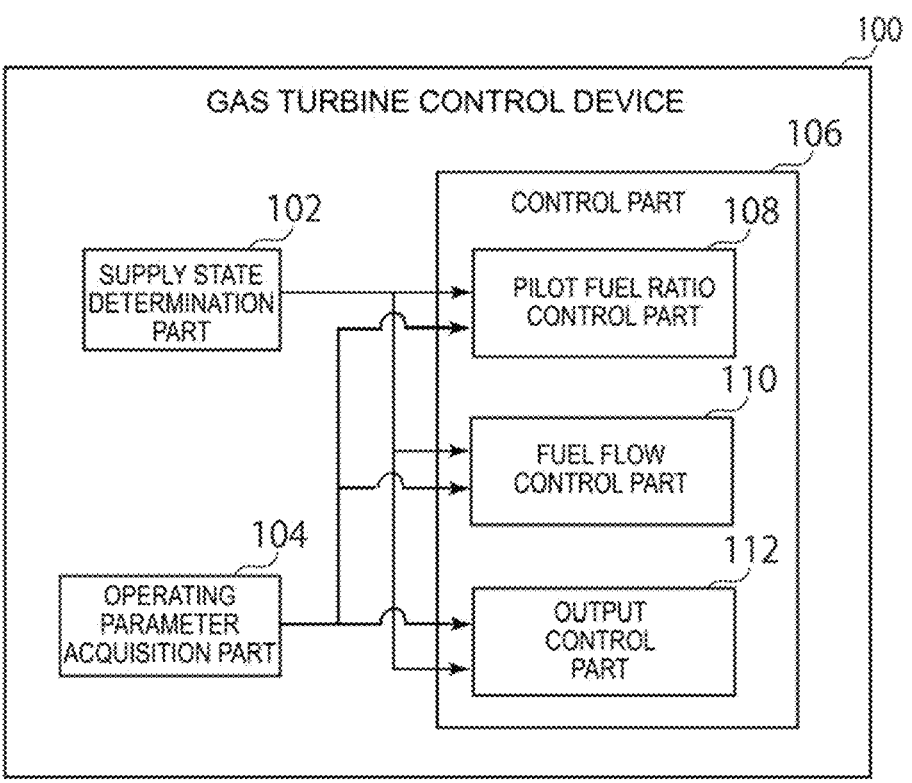
FIG. 3 is a block diagram showing functional components of a gas turbine control device according to an embodiment.

FIG. 3 is a block diagram showing functional components of the gas turbine control device 100 according to an embodiment. The gas turbine control device 100 includes a supply state determination part 102, an operating parameter acquisition part 104, and a control part 106.

The supply state determination part 102 is configured to determine the supply state of the second fuel F2 to the combustor 2. In the present embodiment, the gas turbine 1 is configured to be able to determine whether the second fuel F2 has been shut off in a co-firing operation state where both the first fuel F1 and the second fuel F2 are supplied from the fuel supply system 4 (i.e., an operation state where the primary fuel Fn contains a certain amount of second fuel F2).

For example, the second fuel F2 is shut off when the fuel mixture ratio calculated based on the flow rate of the first fuel F1 detected by the flow meter 10 and the flow rate of the second fuel F2 detected by the flow meter 15 reaches or exceeds a predetermined reference value. Therefore, the supply state determination part 102 may determine that the second fuel F2 has been shut off when the fuel mixture ratio reaches or exceeds the predetermined reference value.

The second fuel F2 is also shut off when the pressure in the second fuel supply line 16, as detected by the pressure sensor 19, falls below a predetermined reference value. Therefore, the supply state determination part 102 may determine that the second fuel F2 has been shut off when a detected value of the pressure sensor 19 falls below the predetermined reference value.

The second fuel F2 is also shut off when the amount of leakage of the second fuel F2, as detected by the leak sensor 32, reaches or exceeds a predetermined reference value. Therefore, the supply state determination part 102 may determine that the second fuel F2 has been shut off when a detected value of the leak sensor 32 reaches or exceeds the predetermined reference value.

If a control signal is sent to the shut-off valve 13 in the second fuel supply line 16 to shut off the second fuel F2 when some abnormality occurs in any component of the gas turbine 1, the supply state determination part 102 may determine whether the second fuel F2 has been shut off on the basis of this control signal.

The operating parameter acquisition part 104 is configured to acquire operating parameters indicating the operating state of the gas turbine 1. The operating parameters may be any parameters that indicate the operating state of the gas turbine 1, and can include values detected by sensors, control parameters, and calculation results using these parameters.

The control part 106 is configured to control the gas turbine 1 on the basis of the operating parameters acquired by the operating parameter acquisition part 104. The control parameters handled by the control part 106 can be selected freely. FIG. 3 shows some components of the control part 106: a pilot fuel ratio control part 108, which handles the pilot fuel ratio Rp as control parameter; a fuel flow control part 110, which handles the fuel flow rate as control parameter; and an output control part 112, which handles the output of the gas turbine 1 as control parameter.

The pilot fuel ratio control part 108 is configured to control the pilot fuel ratio Rp on the basis of the operating parameters. The pilot fuel ratio Rp is defined as the ratio of the flow rate of the pilot fuel Fp to the total flow rate of the primary fuel Fn supplied to the combustor 2. The pilot fuel ratio control part 108 controls the pilot fuel ratio Rp by, for example, PID control so that a measured value of the pilot fuel ratio Rp (calculated using the detected values of the flow meters 10 and 15) becomes a pilot fuel ratio target value, which is the target value corresponding to the pilot fuel ratio Rp.

The fuel flow control part 110 is configured to control the flow rate of the first fuel F1 during the shutoff of the second fuel F2 on the basis of the operating parameters. The fuel flow control part 110 controls the flow rate by PID control so that a measured value of the first fuel F1 (detected by the flow meter 10) becomes a flow rate target value, which is the target value corresponding to the flow rate of the first fuel F1.

The output control part 112 is configured to control the output of the gas turbine 1 on the basis of the operating parameters. The output control part 112 controls the output of the gas turbine 1 by PID control so that a measured value of the output of the gas turbine 1 becomes an output target value, which is the target value corresponding to the output of the gas turbine 1.

In the gas turbine control device 100 having the above configuration, if some abnormality occurs during co-firing operation of the gas turbine 1 where both the first fuel F1 and the second fuel F2 are supplied from the fuel supply system 4, the shut-off valve 13 in the second fuel supply line 16 may be closed to shut off the second fuel F2 (The specific situation in which the second fuel F2 is shut off is as described above). This allows the gas turbine 1 to shift from co-firing operation using the first fuel F1 and the second fuel F2 to single-firing operation using the first fuel F1, so that the gas turbine 1 can continue to operate even when abnormality occurs.

Figure 4:
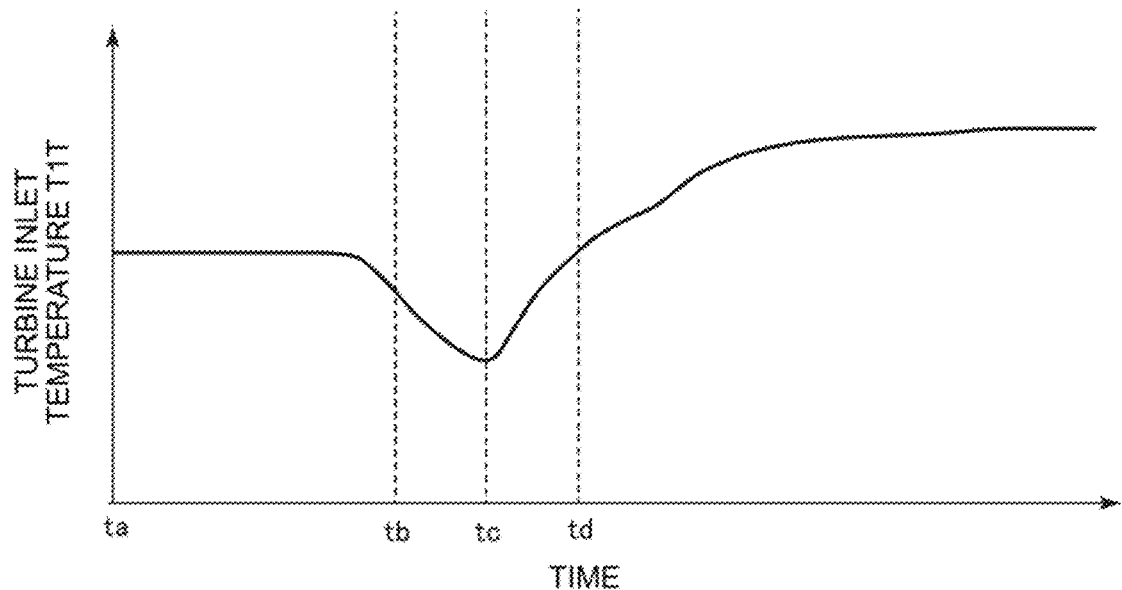
FIG. 4 is a graph showing the time course of the turbine inlet temperature in a gas turbine control method according to a comparative example when the second fuel is shut off in a gas turbine during co-firing operation.

FIG. 4 is a graph showing the time course of the turbine inlet temperature T1T in a gas turbine control method according to a comparative example when the second fuel F2 is shut off in the gas turbine 1 during co-firing operation. In the comparative example, as described below with reference to FIG. 5, after the second fuel F2 is shut off at time ta, the output setting value of the gas turbine 1, the pilot fuel ratio Rp, and the opening degree of the flow control valve installed in the supply path of the primary fuel Fn are kept constant. In such a comparative example, when the second fuel F2 is shut off at time ta, as shown in FIG. 4, the turbine inlet temperature T1T does not significantly change for a while due to the remaining second fuel F2, but eventually the turbine inlet temperature T1T starts to decrease, and temporarily drops to a minimum value at time tc when the primary fuel Fn after shutting off the second fuel F2 (i.e. the first fuel F1 is 100%) reaches the fuel injection nozzles. This indicates that if the opening degree of the flow control valve in the supply path of the primary fuel Fn remains constant to maintain stable operating state of the gas turbine 1, the volume density of the fuel supplied to the combustor 2 decreases under a constant differential pressure before and after the flow control valve, and the turbine inlet temperature T1T temporarily drops. This temporary drop in turbine inlet temperature T1T can lead to misfire in the gas turbine 1. Then, after time td, the turbine inlet temperature T1T, which had temporarily dropped, exhibits the opposite behavior, overshooting to higher temperatures.

Thus, in the comparative example, when the second fuel F2 is shut off in the gas turbine 1 in co-firing operation, the turbine inlet temperature T1T fluctuates, resulting in misfire or overshooting. Such problems in the comparative example can be suitably solved by the gas turbine control method implemented by the gas turbine control device 100 described below.

Figure 5:
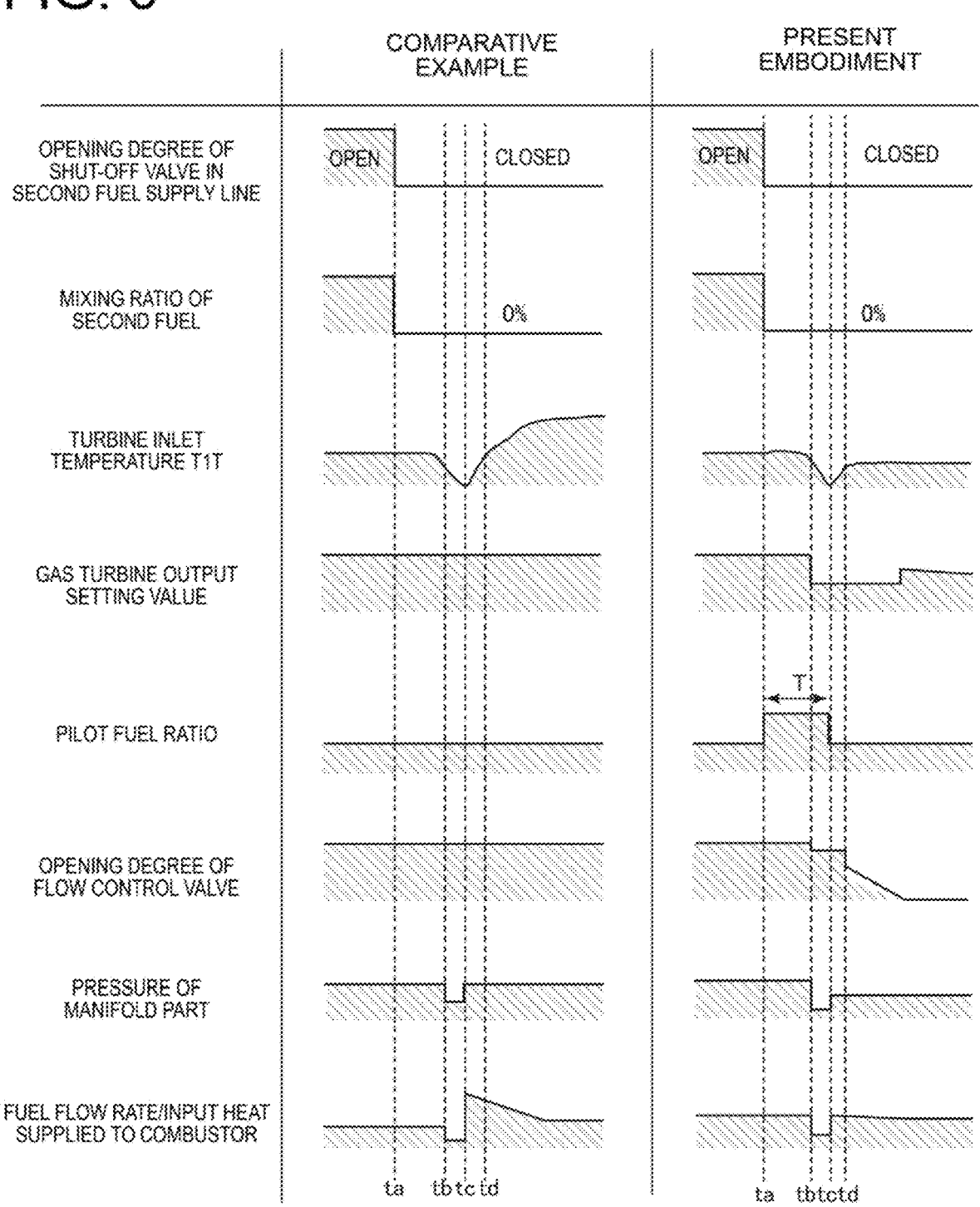
FIG. 5 is a timing chart showing the time course of various operating parameters in a gas turbine controlled by the gas turbine control device of FIG. 3, together with the comparative example.

Next, the gas turbine control method implemented by the gas turbine control device 100 having the above configuration will be described in detail in comparison with the aforementioned comparative example. FIG. 5 is a timing chart showing the time course of various operating parameters in the gas turbine 1 controlled by the gas turbine control device 100 of FIG. 3, together with the comparison example shown in FIG. 4.

The timing charts shown in FIG. 5 illustrate, together with the comparative example, a control example in which the second fuel F2 is shut off by some factor at time ta in the gas turbine 1 in co-firing operation with the first fuel F1 and the second fuel F2 supplied to the combustor 2 from the fuel supply system 4. At time ta, the shut-off valve 13 in the second fuel supply line 16 is switched from open to closed to shut off the second fuel F2. Accordingly, at time ta, the mixing ratio of the second fuel F2 in the primary fuel Fn decreases to 0%. The primary fuel Fn after shutting off the second fuel F2 (i.e., the first fuel F1 is 100%) reaches the fuel injection nozzles at time tc. FIG. 5 shows how each operating parameter, such as turbine inlet temperature T1T, changes after time ta when the second fuel F2 is shut off.

In the comparative example, the output setting value of the gas turbine 1, the pilot fuel ratio Rp, and the opening degree of the flow control valve installed in supply path of the primary fuel Fn are kept constant before and after time ta when the second fuel F2 is shut off, and as described with reference to FIG. 4, the volume density of the fuel supplied to the combustor 2 decreases under a constant differential pressure before and after the flow control valve, and the turbine inlet temperature T1T temporarily drops, which increases the risk of misfire in the gas turbine 1. Further, after time td, the turbine inlet temperature T1T overshoots to higher temperatures.

In contrast to such a comparative example, in the present embodiment, if the supply state determination part 102 determines that the second fuel F2 has been shut off at time ta, the pilot fuel ratio control part 108 of the control part 106 controls the pilot fuel ratio Rp to temporarily increase compared to the comparative example during a period from the first time point, time ta, to time tc, after time T has elapsed. As discussed above with reference to FIG. 4, in the comparative example, when the second fuel F2 is shut off, the turbine inlet temperature T1T temporarily drops, increasing the possibility of misfire. In contrast, in the present embodiment, the combustion stability is improved by temporarily increasing the proportion of fuel injected by the pilot fuel injection nozzle 50*p* during the period when the turbine inlet temperature T1T tends to drop, appropriately preventing misfire in the gas turbine 1.

Further, in the present embodiment, the fuel flow control part 110 of the control part 106 maintains the flow rate of the first fuel F1 at approximately a constant level from the first time point, time ta, to the second time point, time td, after a predetermined time elapses, and controls the flow rate of the first fuel F1 to decrease after time td. More specifically, in the present embodiment, the gas turbine output setting value is reduced at time tb, but the decrease in opening degree of the flow control valve is limited until time td, for example, the opening degree of the flow control valve is maintained within a predetermined range or at a constant value to maintain the flow rate of the first fuel F1. As a result, the flow rate of the first fuel F1 is maintained from time ta to time td, which in turn suppresses the drop in turbine inlet temperature T1T, reducing the risk of misfire. On the other hand, after time td, the flow rate of the first fuel F1 is reduced to suppress the overshooting of the turbine inlet temperature T1T to higher temperatures.

In the present embodiment, the second time point (time td) has been described as the time when a predetermined time has elapsed since the first time point, time ta, but it can also be set as the time when a predetermined time set in advance has elapsed since the pressure drop has been detected by the pressure sensor 31 in the manifold part 29. Even if the second time point is set in this manner, the overshooting of the turbine inlet temperature T1T can be suppressed by reducing the flow rate of the first fuel F1 in accordance with the timing when the turbine inlet temperature T1T overshoots to higher temperatures.

Further, in the present embodiment, the output control part 112 of the control part 106 controls the output setting value of the gas turbine 1 to decrease after the third time point, time tb, compared to the comparative example. Decreasing the output setting value of the gas turbine 1 reduces the output of the gas turbine 1, suitably suppressing the overshooting that occurs when the second fuel F2 is shut off.

The third time point (time td), at which the output setting value of the gas turbine 1 is controlled to decrease, can be set as the time when a predetermined time set in advance has elapsed since the pressure drop has been detected by the pressure sensor 31 in the manifold part 29. By setting the third time point in this manner, the output setting value of the gas turbine 1 is decreased to reduce the output of the gas turbine 1 in accordance with the timing when the turbine inlet temperature T1T overshoots to higher temperatures, and the overshooting of the turbine inlet temperature T1T is suitably suppressed.

Figure 6:
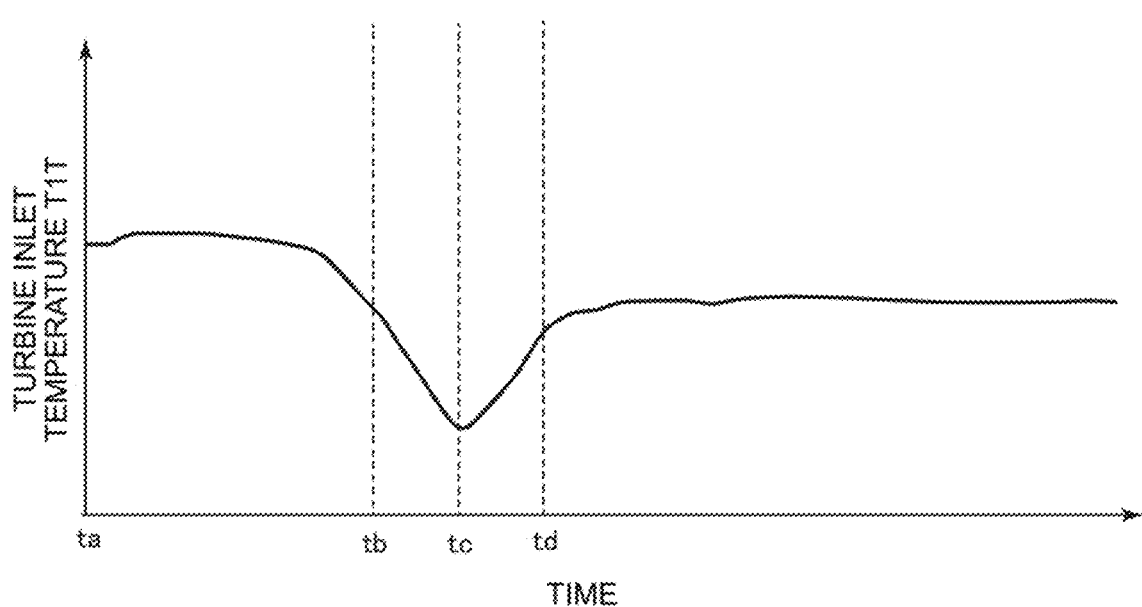
FIG. 6 is a graph showing the time course of the turbine inlet temperature corresponding to the present embodiment of FIG. 5.

FIG. 6 is a graph showing the time course of the turbine inlet temperature T1T corresponding to the present embodiment of FIG. 5. As can be seen, in this embodiment, the temporary drop in turbine inlet temperature T1T that occurs when the second fuel F2 is shut off as shown in FIG. 4 is suppressed, and the misfire in the gas turbine 1 is appropriately prevented. Additionally, in this embodiment, the overshooting of the turbine inlet temperature T1T to higher temperatures after the temporary drop is also suppressed.

In addition, the components in the above-described embodiments may be appropriately replaced with known components without departing from the spirit of the present disclosure, or the above-described embodiments may be appropriately combined.

The contents described in the above embodiments would be understood as follows, for instance.

(1) A gas turbine control device according to one aspect is a gas turbine control device for controlling a gas turbine which includes a combustor capable of co-firing a first fuel and a second fuel with a lower heating value per unit volume than the first fuel, including: a supply state determination part for determining a supply state of the second fuel to the combustor; and a pilot fuel ratio control part for controlling a pilot fuel ratio which is a ratio of fuel distributed to a pilot fuel injection nozzle among a plurality of fuel injection nozzles of the combustor. The pilot fuel ratio control part is configured to control the pilot fuel ratio to temporarily increase when the supply state is determined to be a shut-off state by the supply state determination part.

According to aspect (1), in a gas turbine that co-fires the first fuel and the second fuel, when the second fuel is shut off, the pilot fuel ratio, which is the ratio of fuel distributed to the pilot fuel injection nozzle among the plurality of fuel injection nozzles of the combustor, is controlled to temporarily increase. This improves combustion stability by increasing the proportion of fuel injected by the pilot fuel injection nozzle when the turbine inlet temperature drops due to a decrease in volumetric flow rate of the fuel supplied during the second fuel shutoff, appropriately preventing the misfire.

(2) In another aspect, in the above aspect (1), the control device further includes a fuel flow control part for controlling a fuel flow rate supplied to the combustor. The fuel flow control part is configured to control the fuel flow rate to decrease at a second time point that is later than a first time point at which the pilot fuel ratio is temporarily increased by the pilot fuel ratio control part.

According to aspect (2), the fuel flow rate supplied to the combustor is controlled to decrease at the second time point that is later than the first time point at which the pilot fuel ratio is controlled to temporarily increase during the second fuel shutoff. The turbine inlet temperature temporarily drops when the second fuel is shut off, as described above, but then exhibits the opposite behavior, overshooting to higher temperatures. In this aspect, the overshooting of the turbine inlet temperature can be suitably suppressed by decreasing the fuel flow rate supplied to the combustor when the turbine inlet temperature overshoots to higher temperatures.

(3) In another aspect, in the above aspect (2), the fuel flow control part is configured to keep the fuel flow rate constant until the second time point.

According to aspect (3), the fuel flow rate supplied to the combustor is kept constant until the above-described fuel flow decrease control is initiated at the second time point. As a result, the fuel flow rate is maintained just after shutting off the second fuel, which in turn suppresses the drop in turbine inlet temperature, reducing the risk of misfire.

(4) In another aspect, in the above aspect (2) or (3), the second time point is set as a time point when a predetermined time set in advance has elapsed since the second fuel has been shut off.

According to aspect (4), the second time point, at which the fuel flow rate to the combustor is controlled to temporarily decrease, is set as the time point when a predetermined time has elapsed since the second fuel has been shut off. This allows the fuel flow rate to the combustor to temporarily decrease at the timing when the turbine inlet temperature overshoots to higher temperatures during the second fuel shutoff, suitably suppressing the overshooting.

(5) In another aspect, in any one of the above aspects (1) to (4), the control device further includes an output control part for controlling an output of the gas turbine. The output control part is configured to control the output to temporarily decrease at a third time point that is later than a first time point at which the pilot fuel ratio is temporarily increased by the pilot fuel ratio control part.

According to aspect (5), the output of the gas turbine is set to temporarily decrease at the third time point that is later than the first time point at which the pilot fuel ratio is controlled to temporarily increase during the second fuel shutoff. The turbine inlet temperature temporarily drops when the second fuel is shut off, as described above, but then exhibits the opposite behavior, overshooting to higher temperatures. In this aspect, the overshooting of the turbine inlet temperature can be suitably suppressed by temporarily decreasing the output of the gas turbine when the turbine inlet temperature overshoots to higher temperatures.

(6) In another aspect, in the above aspect (5), the third time point is set as a time point when a predetermined time set in advance has elapsed since pressure drop has been detected by a pressure sensor disposed in a manifold part connected to the plurality of fuel injection nozzles.

According to aspect (6), the third time point, at which the output of the gas turbine is controlled to temporarily decrease, is set as the time when a predetermined time set in advance has elapsed since the pressure drop has been detected by the pressure sensor in the manifold part. This allows the output of the gas turbine to temporarily decrease at the timing when the turbine inlet temperature overshoots to higher temperatures during the second fuel shutoff, suitably suppressing the overshooting.

(7) In another aspect, in any one of the above aspects (1) to (6), the supply state determination part is configured to determine the supply state on the basis of a detection result of a sensor disposed in a fuel supply system for supplying the second fuel to the combustor.

According to aspect (7), it is possible to suitably determine whether the second fuel has been shut off, on the basis of a detection result of the sensor in the fuel supply system.

(8) In another aspect, in any one of the above aspects (1) to (7), the first fuel is LNG, and the second fuel is hydrogen gas.

According to aspect (8), it is possible to prevent misfire in a gas turbine that can co-fire LNG and hydrogen gas when the hydrogen gas is shut off for some reason.

(9) A gas turbine control method according to one aspect is a gas turbine control method for controlling a gas turbine which includes a combustor capable of co-firing a first fuel and a second fuel with a lower heating value per unit volume than the first fuel, including: a step of determining a supply state of the second fuel to the combustor; and a step of controlling a pilot fuel ratio which is a ratio of fuel distributed to a pilot fuel injection nozzle among a plurality of fuel injection nozzles of the combustor. The pilot fuel ratio is controlled to temporarily increase when the supply state is determined to be a shut-off state.

According to aspect (9), in a gas turbine that co-fires the first fuel and the second fuel, when the second fuel is shut off, the pilot fuel ratio, which is the ratio of fuel distributed to the pilot fuel injection nozzle among the plurality of fuel injection nozzles of the combustor, is controlled to temporarily increase. This improves combustion stability by increasing the proportion of fuel injected by the pilot fuel injection nozzle when the turbine inlet temperature drops due to a decrease in volumetric flow rate of the fuel supplied during the second fuel shutoff, appropriately preventing the misfire.

(10) A gas turbine control program according to one aspect is a gas turbine control program for controlling a gas turbine which includes a combustor capable of co-firing a first fuel and a second fuel with a lower heating value per unit volume than the first fuel, the gas turbine control program causing a computer device to execute: a step of determining a supply state of the second fuel to the combustor; and a step of controlling a pilot fuel ratio which is a ratio of fuel distributed to a pilot fuel injection nozzle among a plurality of fuel injection nozzles of the combustor. The pilot fuel ratio is controlled to temporarily increase when the supply state is determined to be a shut-off state.

According to aspect (10), in a gas turbine that co-fires the first fuel and the second fuel, when the second fuel is shut off, the pilot fuel ratio, which is the ratio of fuel distributed to the pilot fuel injection nozzle among the plurality of fuel injection nozzles of the combustor, is controlled to temporarily increase. This improves combustion stability by increasing the proportion of fuel injected by the pilot fuel injection nozzle when the turbine inlet temperature drops due to a decrease in volumetric flow rate of the fuel supplied during the second fuel shutoff, appropriately preventing the misfire.

The invention claimed is:

1. A gas turbine control device for controlling a gas turbine which includes a combustor capable of co-firing a first fuel supplied through a first fuel supply line and a second fuel with a lower heating value per unit volume than the first fuel and supplied through a second fuel supply line joined with the first fuel supply line at a confluence point on a downstream side of the first fuel supply line and the second fuel supply line, the gas turbine control device comprising:
   a processor,
   wherein the processor is configured to:
   determine a supply state of the second fuel to the combustor;
   control a pilot fuel ratio which is a ratio of fuel distributed to a pilot fuel injection nozzle among a plurality of fuel injection nozzles of the combustor; and
   control the pilot fuel ratio to temporarily increase when the supply state is determined to be a shut-off state by the processor.

2. The gas turbine control device according to claim 1, wherein the processor is configured to control a fuel flow rate supplied to the combustor to decrease at a second time point that is later than a first time point at which the pilot fuel ratio is temporarily increased by the processor.

3. The gas turbine control device according to claim 2, wherein the processor is configured to keep the fuel flow rate constant until the second time point.

4. The gas turbine control device according to claim 2, wherein the second time point is when a predetermined time set in advance has elapsed since the second fuel has been shut off.

5. The gas turbine control device according to claim 1, wherein the processor is configured to control an output of the gas turbine to temporarily decrease at a third time point that is later than a first time point at which the pilot fuel ratio is temporarily increased by the processor.

6. The gas turbine control device according to claim 5, wherein the third time point is when a predetermined time set in advance has elapsed since a pressure drop has been detected by a pressure sensor in a manifold part connected to the plurality of fuel injection nozzles.

7. The gas turbine control device according to claim 1, wherein the processor is configured to determine the supply state based on a detection result of a sensor in a fuel supply system for supplying the second fuel to the combustor.

8. The gas turbine control device according to claim 1, wherein:
the first fuel is liquefied natural gas; and
the second fuel is hydrogen gas.

9. The gas turbine control device according to claim 1, wherein the gas turbine control device is configured to supply the first fuel to the plurality of fuel injection nozzles through a primary fuel supply line from the confluence point.

10. The gas turbine control device according to claim 1, wherein the gas turbine control device is configured to supply the second fuel to the plurality of fuel injection nozzles through a primary fuel supply line from the confluence point.

11. The gas turbine control device according to claim 1, wherein the gas turbine control device is configured to supply the first fuel and the second fuel to the plurality of fuel injection nozzles through a primary fuel supply line from the confluence point.

12. A gas turbine control method for controlling a gas turbine which includes a combustor capable of co-firing a first fuel supplied through a first fuel supply line and a second fuel with a lower heating value per unit volume than the first fuel and supplied through a second fuel supply line joined with the first fuel supply line at a confluence point on a downstream side of the first fuel supply line and the second fuel supply line, the gas turbine control method comprising:
determining a supply state of the second fuel to the combustor; and
controlling a pilot fuel ratio which is a ratio of fuel distributed to a pilot fuel injection nozzle among a plurality of fuel injection nozzles of the combustor,
wherein the pilot fuel ratio is controlled to temporarily increase when the supply state is determined to be a shut-off state.

13. A non-transitory computer-readable medium storing a gas turbine control program for controlling a gas turbine which includes a combustor capable of co-firing a first fuel supplied through a first fuel supply line and a second fuel with a lower heating value per unit volume than the first fuel and supplied through a second fuel supply line joined with the first fuel supply line at a confluence point on a downstream side of the first fuel supply line and the second fuel supply line, the gas turbine control program causing a computer device to execute:
determining a supply state of the second fuel to the combustor; and
controlling a pilot fuel ratio which is a ratio of fuel distributed to a pilot fuel injection nozzle among a plurality of fuel injection nozzles of the combustor,
wherein the pilot fuel ratio is controlled to temporarily increase when the supply state is determined to be a shut-off state.

* * * * *